(12) United States Patent
Shimizu

(10) Patent No.: US 12,478,568 B2
(45) Date of Patent: Nov. 25, 2025

(54) METHOD FOR PRODUCING 1,3-BUTYLENE GLYCOL, AND 1,3-BUTYLENE GLYCOL PRODUCT

(71) Applicant: DAICEL CORPORATION, Osaka (JP)

(72) Inventor: Masahiko Shimizu, Tokyo (JP)

(73) Assignee: DAICEL CORPORATION, Osaka (JP)

(*) Notice: Subject to any disclaimer, the term of this patent is extended or adjusted under 35 U.S.C. 154(b) by 735 days.

(21) Appl. No.: 17/788,803

(22) PCT Filed: Dec. 23, 2020

(86) PCT No.: PCT/JP2020/048186
§ 371 (c)(1),
(2) Date: Jun. 24, 2022

(87) PCT Pub. No.: WO2021/132343
PCT Pub. Date: Jul. 1, 2021

(65) Prior Publication Data
US 2023/0035233 A1 Feb. 2, 2023

(30) Foreign Application Priority Data

Dec. 28, 2019 (JP) .................. 2019-239974
Dec. 28, 2019 (JP) .................. 2019-239975
(Continued)

(51) Int. Cl.
*A61K 8/34* (2006.01)
*A61Q 19/00* (2006.01)
(Continued)

(52) U.S. Cl.
CPC .............. *A61K 8/345* (2013.01); *A61Q 19/00* (2013.01); *A61Q 19/007* (2013.01);
(Continued)

(58) Field of Classification Search
CPC ..... C07C 29/80; C07C 31/207; C07C 29/141; C07C 29/84; C07C 29/60; A61Q 19/00;
(Continued)

(56) References Cited

U.S. PATENT DOCUMENTS 5,345,004 A   9/1994 Nishiguchi
5,583,270 A  12/1996 Nishiguchi
(Continued)

FOREIGN PATENT DOCUMENTS

JP   6-329664 A   11/1994
JP   2001-213825 A   8/2001
(Continued)

OTHER PUBLICATIONS

Partial Supplementary European Search Report for European Application No. 20906817.0, dated Feb. 27, 2024.
(Continued)

*Primary Examiner* — Jafar F Parsa
(74) *Attorney, Agent, or Firm* — Morgan, Lewis & Bockius LLP

(57) ABSTRACT

Provided is a method capable of yielding high-purity 1,3-butylene glycol having a very low content of a low boiling point component and a high initial boiling point, with a high recovery ratio. A reaction crude liquid containing 1,3-butylene glycol is subjected to product distillation to yield purified 1,3-butylene glycol, through dehydration including removing water by distillation and performing high boiling point component removal including removing a high boiling point component by distillation. A method for producing 1,3 butylene glycol, the method including: distilling a charged liquid having a water content of 1.2 wt. % or less in a product column for use in the product distillation under a condition of a reflux ratio of greater than 0.1; distilling off a liquid in which a low boiling point component is concen-
(Continued)

trated from above a charging plate; and extracting 1,3-butylene glycol from below the charging plate.

11 Claims, 3 Drawing Sheets

(30) Foreign Application Priority Data

| Dec. 28, 2019 | (JP) | 2019-239976 |
|---|---|---|
| Dec. 28, 2019 | (JP) | 2019-239977 |
| Dec. 28, 2019 | (JP) | 2019-239978 |
| Dec. 28, 2019 | (JP) | 2019-239979 |
| Jan. 20, 2020 | (JP) | 2020-006660 |
| Feb. 6, 2020 | (JP) | 2020-018910 |

(51) Int. Cl.
*B01D 3/42* (2006.01)
*C07C 29/141* (2006.01)
*C07C 29/60* (2006.01)
*C07C 29/80* (2006.01)
*C07C 29/84* (2006.01)
*C07C 31/20* (2006.01)

(52) U.S. Cl.
CPC .......... *B01D 3/4205* (2013.01); *C07C 29/141* (2013.01); *C07C 29/60* (2013.01); *C07C 29/80* (2013.01); *C07C 29/84* (2013.01); *C07C 31/207* (2013.01); *A61K 2800/10* (2013.01)

(58) Field of Classification Search
CPC .... A61Q 19/007; B01D 3/143; B01D 3/4205; B01D 3/4216
See application file for complete search history.

(56) References Cited

U.S. PATENT DOCUMENTS

| 6,376,725 | B1 | 4/2002 | Tsuji et al. | |
|---|---|---|---|---|
| 6,900,360 | B2 | 5/2005 | Tsuji et al. | |
| 2003/0018224 | A1 | 1/2003 | Tsuji et al. | |
| 2014/0254407 | A1* | 9/2014 | Williams | H04L 27/2657 370/252 |

FOREIGN PATENT DOCUMENTS

| JP | 2001-213828 A | 8/2001 |
|---|---|---|
| WO | WO 00/07969 A1 | 2/2000 |
| WO | WO 01/56963 A1 | 8/2001 |

OTHER PUBLICATIONS

Chinese Office Action and Search Report for corresponding Chinese Application No. 202080090574.6, dated Dec. 20, 2023.
Boyd, D. M. Jr., "Modern Method of Controlling Rectification Column," vol. 3, No. 3, 1964, pp. 159-162, with English translation.
International Search Report for International Application No. PCT/JP2020/048186, dated Mar. 9, 2021, with English translation.
Written Opinion of the International Searching Authority for International Application No. PCT/JP2020/048186, dated Mar. 9, 2021, with English translation.

* cited by examiner

METHOD FOR PRODUCING 1,3-BUTYLENE GLYCOL, AND 1,3-BUTYLENE GLYCOL PRODUCT

TECHNICAL FIELD

The present disclosure relates to a method for producing 1,3-butylene glycol, and a 1,3-butylene glycol product. The present application claims priority from the Japanese Patent Application No. 2019-239974, the Japanese Patent Application No. 2019-239975, the Japanese Patent Application No. 2019-239976, the Japanese Patent Application No. 2019-239977, the Japanese Patent Application No. 2019-239978, the Japanese Patent Application No. 2019-239979 filed in Japan on Dec. 28, 2019, the Japanese Patent Application No. 2020-006660 filed in Japan on Jan. 20, 2020, and the Japanese Patent Application No. 2020-018910 filed in Japan on Feb. 6, 2020, the contents of which are incorporated herein by reference.

BACKGROUND ART 1,3-Butylene glycol is a colorless, transparent, and odorless liquid and has properties, such as low volatility, low toxicity, and high hygroscopicity, and has excellent chemical stability. 1,3-butylene glycol has a wide range of applications, including raw materials for various synthetic resins and surfactants, as well as materials for cosmetics, hygroscopic agents, high boiling point solvents, and antifreezes, etc. Particularly in recent years, 1,3-butylene glycol has been attracting attention for having excellent properties as a moisturizer, and demand is growing in the cosmetic industry.

A reaction crude liquid during production of 1,3-butylene glycol contains a large number of low boiling point impurities such as ethanol, butanol, acetaldehyde, crotonaldehyde, and esters. Dimerization or polymerization to a higher degree of acetaldehyde, crotonaldehyde, and the like, among them, form high boiling point impurities. In addition, even in purification of 1,3-butylene glycol, low boiling point impurities and high boiling point impurities are produced by heat or the like. In products of 1,3-butylene glycol, less impurities are desirable. JP 06-329664 A discloses a method of controlling impurities derived from crotonaldehyde, which is a low boiling point impurity. JP 2001-213828 A discloses a high-yield, economically advantageous production of a high-purity 1,3-butylene glycol product in which a reaction crude liquid of 1,3-butylene glycol synthesized by hydrogenation of acetaldols is made basic, followed by distillation of an alcohol, and then this liquid is distilled. Furthermore, this document describes distilling off ethanol, isopropyl alcohol, and butanol as a low boiling point impurity by distillation.

CITATION LIST

Patent Document

Patent Document 1: JP 06-329664 A
Patent Document 2: JP 2001-213828 A

SUMMARY OF INVENTION

Technical Problem

However, with the known methods, a low boiling point component and a high boiling point component are not sufficiently removed from 1,3 butylene glycol. Cosmetics, which are an important application of 1,3 butylene glycol, typically contain water and require a long period of time from production to actual use by general consumers. In addition, from the viewpoint, such as storage stability of cosmetics, liquidity is strictly controlled.

When 1,3-butylene glycol containing a low boiling point component and a high boiling point component is used in cosmetics, an acid concentration increase can disrupt the liquidity balance of the cosmetics, and this can lead to a loss of the intended effect. In addition, the acid concentration increase of cosmetics can cause rough skin or the like of the users.

Further, during use and/or storage after use of a cosmetic, the cosmetic is exposed to air. In addition, in producing cosmetics, the production is usually performed in air atmosphere, and the product may be heated for the purposes of, for example, sterilization. When 1,3-butylene glycol containing a low boiling point component and a high boiling point component is used in cosmetics, sometimes coloration occurs in the presence of air or by effects of heating.

To solve such problems, removing by-products from crude 1,3-butylene glycol to obtain high-purity 1,3-butylene glycol has been required.

On the other hand, one of quality standards for 1,3-butylene glycol is initial boiling point. The higher the initial boiling point, the better the quality. However, technical studies aimed at improving the initial boiling point have been hardly conducted so far.

Therefore, an object of the present disclosure is to provide a method capable of producing high-purity 1,3-butylene glycol having a very low content of a low boiling point component and a high initial boiling point, with a high recovery ratio.

Another object of the present disclosure are to provide a high-purity 1,3-butylene glycol product having a very low content of a low boiling point component and a high initial boiling point.

Still another object of the present disclosure is to provide a moisturizer and a cosmetic product that have an excellent moisturizing performance and can retain high quality for a long period of time.

Solution to Problem

As a result of diligent research to achieve the purpose described above, the inventors of the present disclosure have found that, when a content of water in a charged liquid into a product column is specified, a reflux ratio in the product column is controlled, and a product column distillate is recycled to a dehydration column and a low boiling point component removal column, it is possible to efficiently remove the low boiling component mixed in the charged liquid into the product column, and maintain and improve the recovery ratio of 1,3-butylene glycol while maintaining the initial boiling point of 1,3-butylene glycol within a defined value range. The present disclosure was completed based on these findings.

Specifically, the present disclosure provides a method for producing 1,3-butylene glycol to obtain purified 1,3-butylene glycol from a reaction crude liquid comprising 1,3-butylene glycol, the method including: dehydration for removing water by distillation, removing a high boiling point component including removing a high boiling point component by distillation, and performing product distillation to yield purified 1,3-butylene glycol, wherein, in a product column for use in the performing product distillation, a charged liquid containing 1,3-butylene glycol is distilled off under a condition of a reflux ratio of greater than 0.1, a liquid in which a low boiling point component is concentrated is distilled off from above a charging plate, and 1,3-butylene glycol is extracted from below the charging plate.

The reaction crude liquid containing 1,3-butylene glycol may be a reaction crude liquid formed by hydrogen reduction of acetaldols.

The producing method further includes alkaline treatment including treating a process stream containing 1,3-butylene glycol with a base.

The producing method may further include desalting including removing a salt in a process stream containing 1,3-butylene glycol.

The production method may further include performing dealcoholization including removing a low boiling point substance containing an alcohol in a process stream containing 1,3-butylene glycol.

The reflux ratio of the product column may be 0.2 or greater.

A concentration of 1,3-butylene glycol in the charged liquid into the product column may be 90% or greater.

A content of water in the charged liquid into the product column may be 3 wt. % or less.

A content of the low boiling point component other than water in the charged liquid into the product column may be 1.8% or less.

A distillation ratio in the product column may be less than 30 wt. %.

A theoretical number of plates in the product column may be from 1 to 100 plates.

At least a portion of a distillate from the product column may be recycled to the dehydration, dealcoholization, low boiling point component removal prior to the performing product distillation, or a step prior to the steps.

An recycled amount of the distillate from the product column recycled to the step prior to the performing product distillation may be less than 30 wt. % with respect to a charged amount into the product column, in a range of not greater than a distilled amount in the product column.

The recycled amount of the distillate from the product column recycled to the step prior to the performing product distillation may be 0.01 wt. % or greater with respect to the charged amount into the product column, in the range of not greater than the distilled amount in the product column.

The present disclosure also provides a 1,3-butylene glycol product having an initial boiling point of higher than 203° C. and a water content of less than 0.4 wt. %.

The 1,3-butylene glycol product according to the present disclosure may have, in a gas chromatographic analysis performed under conditions,
- an area ratio of a 1,3-butylene glycol peak of greater than 98.5% and a total area ratio of peaks shorter in retention time than the 1,3-butylene glycol peak of less than 0.3%,
- in which the conditions for the gas chromatographic analysis are as follows:
- Analytical Column: a column with dimethylpolysiloxane as a stationary phase, having a length of 30 m, an inner diameter of 0.25 mm, and a film thickness of 1.0 μm
- Heating conditions: heating from 80° C. to 120° C. at 5° C./min, then heating again to 160° C. at 2° C./min and maintaining for 2 minutes, and further heating to 230° C. at 10° C./min and maintaining at 230° C. for 18 minutes Sample Introduction Temperature: 250° C.
Carrier Gas: helium
Column Gas Flow Rate: 1 mL/min
Detector and Detection Temperature: a flame ionization detector (FID), 280° C.

The present disclosure further provides a moisturizer containing the 1,3-butylene glycol product described above.

The present disclosure further provides a cosmetic product containing the moisturizer described above.

In the present disclosure, "1,3-butylene glycol product" means a composition in which 1,3-butylene glycol accounts for a majority among the components (e.g., a 1,3-butylene glycol content is 95 wt. % or greater, preferably 98 wt. % or greater).

Advantageous Effects of Invention

According to the production method of the present disclosure, it is possible to produce high-purity 1,3-butylene glycol having a very low content of a low boiling point component and a high initial boiling point, with a high recovery ratio.

In addition, the 1,3-butylene glycol product of the present disclosure has a very low content of the low boiling point component a high initial boiling point, and high purity. Therefore, it is suitably used as a moisturizer and in an application as a raw material for cosmetics.

Further, the moisturizer and cosmetic product of the present disclosure are excellent in moisturizing performance and have an extremely low content of the low boiling point component, and thus can maintain high quality for a long period of time.

DESCRIPTION OF EMBODIMENTS

Method for producing 1,3-butylene glycol

Figure 1:
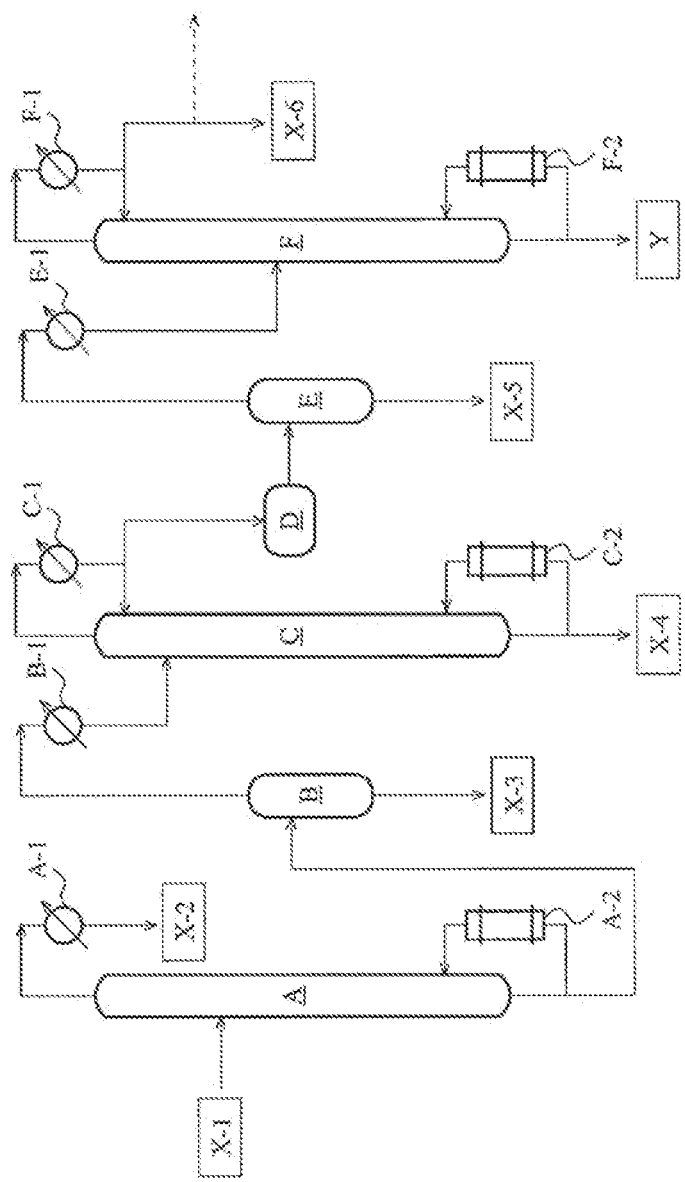
FIG. 1 is a flowchart illustrating a producing method (purification method) for a 1,3-butylene glycol product of the present disclosure.

The method for producing 1,3-butylene glycol of the present disclosure is a method for producing 1,3-butylene glycol to yield purified 1,3-butylene glycol from a reaction crude liquid containing 1,3-butylene glycol (1,3 BG) (hereinafter sometimes referred to as "crude 1,3-butylene glycol"), the method including: performing dehydration including removing water by distillation, removing high boiling point component including removing a high boiling point component by distillation, and performing product distillation to yield purified 1,3-butylene glycol. In the product column for use in the product distillation, a charged liquid containing 1,3-butylene glycol is distilled under a condition of a reflux ratio of greater than 0.1, a liquid in which the low boiling point component is concentrated is distilled off from above a charging plate, and 1,3-butylene glycol is extracted from below the charging plate. The 1,3-butylene glycol has a very low content of the low boiling point component and a high initial boiling point, and thus can be made into a 1,3-butylene glycol product.

Crude 1,3-butylene glycol

Examples of the crude 1,3-butylene glycol include (1) a reaction crude liquid produced by reduction (hydrogenation) of acetaldols, (2) a reaction crude liquid produced by hydrolysis of 1,3-butylene oxide, (3) a reaction crude liquid produced by selective hydrocracking of erythritol, (4) a reaction crude liquid produced by selective hydration to butadiene, (5) a reaction crude liquid produced by hydrogen addition to n-butanal-3-one, (6) a reaction crude liquid produced by hydrogen addition to 1-butanol-3-one, (7) a reaction crude liquid produced by hydrogen addition to 3-hydroxy-1-butanoic acid, (8) a reaction crude liquid produced by hydrogen addition to B-butyrolactone, and (9) a reaction crude liquid produced by hydrogen addition to diketene. In the present disclosure, the crude 1,3-butylene glycol may be one type or a mixture of two or more types of the above (1) to (9). The crude 1,3-butylene glycol is preferably (1) the reaction crude liquid produced by reduction (in particular, liquid phase reduction) of acetaldols.

Hereinafter, a case where the reaction crude liquid produced by reduction (hydrogenation) of acetaldols is used as the crude 1,3-butylene glycol will be mainly described. Note that the reduction (hydrogenation) of acetaldols is sometimes referred to as "hydrogenation".

The acetaldols used as a raw material in the hydrogenation is not particularly limited as long as it is a compound that is converted to 1,3-butylene glycol by hydrogen reduction. Examples of the raw material acetaldols include acetaldol; its cyclic dimer paraldol; aldoxane as a cyclic trimer of acetaldehyde; and mixtures of these.

The method of producing the acetaldols (e.g., acetaldol or paraldol) is not particularly limited, but the acetaldols may be, for example, those produced by an aldol condensation reaction of acetaldehyde in the presence of a basic catalyst or those produced by pyrolysis or the like of aldoxane. Note that the production of the acetaldols is sometimes referred to as "acetaldol production" or "acetaldehyde polymerization"

A reaction crude liquid produced by the reaction described above and containing acetaldols may be neutralized with an acid and used in the producing of 1,3-butylene glycol. Such a reaction crude liquid may contain, in addition to acetaldols, acetaldehyde, crotonaldehyde, another aldehyde component; a low boiling point component; a high boiling point substance, such as an aldehyde dimer or trimer; water; a salt; and the like. In the present specification, a compound with a lower boiling point than that of 1,3-butylene glycol may be referred to as a "low boiling point substance" or "low boiling substance", and a compound with a higher boiling point than that of 1,3-butylene glycol may be referred to as a "high boiling point substance" or "high boiling substance".

The reaction crude liquid containing acetaldols may be subjected to a pretreatment, such as dealcoholization distillation, dehydration distillation, desalting, alkaline treatment and dealkalization treatment, or impurity removal, as necessary, and a liquid produced by removing by-products, such as unreacted acetaldehyde and crotonaldehyde, may be used. Examples of the pretreatment method include distillation, adsorption, ion exchange, conversion to a high boiling point substance by heating, and decomposition. For the distillation, a distillation method of various types, such as reduced pressure, normal pressure, increased pressure, azeotropic, extraction, or reaction, can be used. In particular, it is preferred that the reaction crude liquid containing acetaldols is subjected to simple evaporation, distillation, or hydrogen addition to remove aldehydes such as acetaldehyde and crotonaldehyde, followed by the hydrogenation.

The content of the acetaldols in the raw material for hydrogenation is not particularly limited but is, for example, preferably 30 wt. % or greater (e.g., from 30 to 99 wt. %), more preferably 40 wt. % or greater (for example, from 40 to 98 wt. %), 50 wt. % or greater (for example, from 50 to 97 wt. %) or 60 wt. % or greater (for example, from 60 to 95 wt. %), and even more preferably from 65 to 90 wt. %, particularly preferably from 70 to 90 wt. %, and most preferably from 75 to 90 wt. %. With the content of the acetaldols within the above ranges, impurities contained in the reaction crude liquid containing 1,3-butylene glycol (crude 1,3-butylene glycol) tend to be reduced.

The raw material for hydrogenation may or may not contain water but preferably contains water from the viewpoint of the purity of 1,3-butylene glycol product. The water content in the raw material for hydrogenation is not particularly limited but is, for example, preferably 2 wt. % or greater, more preferably 5 wt. % or greater, even more preferably 10 wt. % or greater, and particularly preferably 15 wt. % or greater. The upper limit may be, for example, 90 wt. %, 80 wt. %, 70 wt. %, 60 wt. %, 50 wt. %, 40 wt. %, 30 wt. % or 20 wt. %. With the water content within the above ranges, the acetal of 1,3-butylene glycol and acetaldol contained in the resulting crude 1,3-butylene glycol is reduced, and thus this tends to increase the purity of the 1,3-butylene glycol product finally produced. This is because the raw material for hydrogenation contains water to a certain extent, and the acetal is hydrolyzed into 1,3-butylene glycol accordingly as well as coexisting acetaldol is reduced into 1,3-butylene glycol.

Examples of the hydrogenation catalyst include Raney nickel. The hydrogenation catalyst can also be used in a suspended state, and can also be filled in a reaction vessel and used. The amount of the hydrogenation catalyst to be used is not particularly limited but is, for example, preferably from 1 to 30 parts by weight, more preferably from 4 to 25 parts by weight, even more preferably from 8 to 20 parts by weight, and particularly preferably from 12 to 18 parts by weight relative to 100 parts by weight of the raw material for hydrogenation. The amount of hydrogen to be used in the reduction reaction is not particularly limited but is, for example, preferably from 0.5 to 40 parts by weight, more preferably from 1 to 30 parts by weight, even more preferably from 4 to 20 parts by weight, and particularly preferably from 8 to 12 parts by weight relative to 100 parts by weight of the raw material for hydrogenation. A pressure (total pressure; gauge pressure) in a reaction system in the reduction reaction is not particularly limited but is, for example, preferably from 9 to 70 MPa and more preferably from 10 to 40 MPa. A hydrogen pressure (partial pressure of hydrogen) in the reaction system is not particularly limited, but is, for example, from 7 to 60 MPa, and preferably from 10 to 30 MPa. A reaction temperature in the reduction reaction is not particularly limited but is, for example, from 40 to 150° C., preferably from 50 to 140° C., and more preferably from 60 to 130° C. A reaction time (residence time) in the reduction reaction is not particularly limited but is, for example, from 10 to 500 minutes, preferably from 20 to 400 minutes, more preferably from 30 to 300 minutes, even more preferably from 50 to 280 minutes, and particularly preferably from 80 to 250 minutes. The present reaction can be carried out in any of a batch, semi-batch, or continuous manner.

For example, the thus-produced crude 1,3-butylene glycol contains a low boiling point substance (low boiling point compound) having an unsaturated bond, such as acetaldehyde (AD), butylaldehyde, crotonaldehyde (CR), acetone, and methyl vinyl ketone; a condensate of these; a condensate of 1,3-butylene glycol and the low boiling point substance above (e.g., an acetal of 1,3-butylene glycol and acetaldol); an alcohol such as ethanol, isopropyl alcohol, or butanol; water (solvent and the like), a salt produced by neutralization or the like, a catalyst (when used in suspension) or the like. Removal of these impurities in the purification can yield a 1,3-butylene glycol product (purified 1,3-butylene glycol).

Purification of crude 1,3-butylene glycol

The producing method according to the present disclosure includes, at least, performing dehydration including removing water by distillation, removing high boiling point component (high boiling point substance removal distillation) including removing a high boiling point component by distillation, and performing product distillation to yield purified 1,3-butylene glycol. The dehydration and the high boiling point component removal are both provided before the product distillation, but the order of the dehydration and the high boiling point component removal is not particularly limited. The producing method according to the present disclosure may include, in addition to these steps, desalting, alkaline reaction (alkaline treatment), and dealkalization. Additionally, prior to the dehydration, catalyst separation, neutralization by alkali, dealcoholization (low boiling point component removal), and the like can be provided. These steps may be performed in the order described above, but the order of the steps may be changed as appropriate except that the dealkalization is provided after the alkaline reaction. For example, the dealcoholization (low boiling point component removal), the desalting, the alkaline reaction, and the dealkalization can be provided at appropriate points, but are usually provided after the hydrogenation. Note that, among the steps described above, the catalyst separation, the neutralization by alkali, the dealcoholization (low boiling point component removal), the desalting, the alkaline reaction, and the dealkalization may be provided as necessary, and do not necessarily have to be provided.

FIG. 1 is a flow sheet of an apparatus illustrating an example of an embodiment of a method for producing 1,3-butylene glycol according to the present disclosure. A is a dehydration column and is related to the dehydration. B is a desalting column and is related to the desalting. C is a distillation column for removing a high boiling point substance (high boiling point component removal column) and is related to the distillation for removal of a high boiling point substance (high boiling point component removal). D is an alkaline reactor and is related to the alkaline reaction. E is a dealkalization column and is related to the dealkalization. F is a product distillation column (product column) and is related to the product distillation. A-1, B-1, C-1, E-1, and F-1 are condensers. A-2, C-2, and F-2 are reboilers. Hereinafter, an example of an embodiment of a method for producing 1,3-butylene glycol according to the present disclosure will be described using the present flow sheet.

Crude 1,3-butylene glycol (corresponding to "X-1") produced by hydrogen reduction of a raw material for hydrogenation is fed to the dehydration column A. In the dehydration column A, water is distilled off from the top of the column by distillation, and from the bottom of the column, a crude 1,3-butylene glycol stream containing 1,3-butylene glycol is produced. Note that the crude 1,3-butylene glycol (corresponding to "X-1") may undergo the dealcoholization (distillation by a dealcoholization column) for removal of an alcohol such as ethanol and a low boiling point substance, and then may be supplied to the dehydration column A.

The crude 1,3-butylene glycol stream is fed to the desalting column B. In the desalting column B, the crude 1,3-butylene glycol stream after the desalting is produced from the top of the column, and a salt, a high boiling point substance, or the like is discharged from the bottom of the column. The bottom ratio (%) of the desalting column B [(desalting column bottom amount (part)/desalting column charged amount (part)×100] is, for example, from 0.1 to 40 wt. %, preferably from 1 to 35 wt. %, more preferably from 2 to 30 wt. %, even more preferably from 3 to 25 wt. %, and particularly preferably from 5 to 20 wt. %, and may be from 7 to 15 wt. %. At least a portion of the bottom in the desalting column may be recycled to the step prior to the desalting.

The crude 1,3-butylene glycol stream after the desalting described above is fed to the high boiling point component removal column C. In the high boiling point component removal column C, a high boiling point component (high boiling point substance) is discharged from below the charging plate (preferably from the bottom of the column). On the other hand, the crude 1,3-butylene glycol stream after high boiling point substance removal (high-purity 1,3-butylene glycol) is produced from above the charging plate.

The high boiling point component removal column C can be, for example, a perforated-plate column, a bubble column, or the like, but is more preferably a packed column with a low pressure loss, filled with Sulzer Packing, Melapack (both are trade names of Sumitomo Heavy Industries, Ltd.). This is because 1,3-butylene glycol and trace impurities would be thermally decomposed at a high temperature (e.g., 150° C. or higher) and produce a low boiling point substance, which is a coloring component, and thus the distillation temperature is to be lowered. In addition, this is also because a long thermal history (residence time) for 1,3-butylene glycol would also have a similar effect. Thus, the reboiler employed is preferably one with a short residence time of the process side fluid, for example, a thin-film evaporator, such as a natural downward flow thin-film evaporator or a forced-stirring thin-film evaporator.

A theoretical number of plates of the high boiling point component removal column C is, for example, from 1 to 100 plates, preferably from 2 to 90 plates, more preferably from 3 to 80 plates, more preferably from 4 to 70 plates, from 5 to 60 plates, from 8 to 50 plates, or from 10 to 40 plates, and particularly preferably from 15 to 30 plates. A feed position for the charged liquid is, for example, from 10 to 90%, preferably from 20 to 80%, and more preferably from 30 to 70 plates, and even more preferably from 40 to 60% of a height of the column downward from the top of the high boiling point component removal column. In the distillation in the high boiling point component removal column C, a pressure (absolute pressure) at the top of the column is, for example, from 0.01 to 50 kPa, preferably from 0.1 to 30 kPa, more preferably from 0.3 to 20 kPa, and even more preferably from 0.5 to 10 kPa.

The reflux ratio in the high boiling point component removal column C [high boiling point component removal column reflux amount/high boiling point component removal column distilled amount (discharge amount to outside of distillation column)] is, for example, 0.015 or greater, preferably 0.02 or greater, 0.03 or greater, 0.05 or greater, 0.07 or greater, 0.1 or greater, 0.2 or greater, 0.3 or greater, 0.4 or greater, 0.5 or greater, 0.6 or greater, 0.7 or greater, 0.8 or greater, 0.9 or greater, 1 or greater, 2 or greater, 3 or greater, 4 or greater, 5 or greater, 6 or greater, 7 or greater, 8 or greater, 9 or greater, 10 or greater, 15 or greater, or 20 or greater, and more preferably 30 or greater. An upper limit of the reflux ratio is, for example, 100, preferably 50 from the point of energy cost.

The crude 1,3-butylene glycol stream taken out from above the charging plate of the high boiling point component removal column C is fed to the alkaline reactor (e.g., a flow-through tubular reactor) D and is treated with a base (treated with alkali). The base treatment can decompose by-products contained in the crude 1,3-butylene glycol. The base is added to the alkaline reactor D or its upstream piping or the like. The base is added in an amount, for example, from 0.05 to 10 wt. %, preferably from 0.1 to 1.0 wt. % relative to the crude 1,3-butylene glycol stream subjected to the alkaline treatment. With the added amount of the base exceeding 10 wt. %, the base would precipitate in the distillation column, piping, or the like, and this may cause blockage. In addition, the decomposition reaction of a high boiling point compound would occur, and by-products may be produced adversely. With the added amount of the base of less than 0.05 wt. %, the effect of decomposing by-products is reduced.

The base added in the alkaline reactor D or its upstream piping is not particularly limited but is, for example, preferably an alkali metal compound. Examples of the alkali metal compound include sodium hydroxide, potassium hydroxide, sodium (bi) carbonate, and potassium (bi) carbonate. A basic ion exchange resin can also be used as the base. The base is preferably sodium hydroxide or potassium hydroxide from the perspective of reducing the byproducts contained in the 1,3-butylene glycol product produced finally. The base may be added as is in the solid form but is preferably added in an aqueous solution to facilitate operation and contact with a solution to be treated. One of the bases described above may be used alone, or two or more may be used simultaneously.

The reaction temperature in the alkaline reactor D is not particularly limited but is, for example, preferably from 90 to 140° C. and more preferably from 110 to 130° C. The reaction at a reaction temperature lower than 90° C. would require long reaction residence time and thus require a reactor with a large volume and make the process uneconomical. The reaction at a reaction temperature exceeding 140° C. would increase coloration in the 1,3-butylene glycol product produced finally. The reaction residence time is, for example, preferably from 5 to 120 minutes and more preferably from 10 to 30 minutes. A reaction residence time shorter than 5 minutes may cause an insufficient reaction and adversely affect the quality of the 1,3-butylene glycol product produced finally. A reaction residence time exceeding 120 minutes would require a large reactor and increase the cost of equipment, and thus would be disadvantageous from the economic point of view.

After exiting the alkaline reactor D, the reaction crude liquid stream is fed to the dealkalization column (e.g., thin film evaporator) E if necessary, and the base and the like are removed from the bottom of the column by evaporation. On the other hand, from the top of the dealkalization column E, a crude 1,3-butylene glycol stream after the removal of a base is yielded. The evaporator used for the dealkalization column E is suitably a natural downward flow thin-film evaporator or a forced-stirring thin-film evaporator with a short residence time for the purpose of reducing the thermal history to the process fluid. A demister may be installed in a space above the charging position of the dealkalization column (e.g., thin film evaporator) E, and droplets of a base or the like may be removed. This makes it possible to prevent the base and the high boiling point substance from being mixed into the 1,3-butylene glycol product.

Evaporation is performed in the evaporator used for the dealkalization column E, for example, under a reduced pressure at the top of the column of 20 kPa or less (absolute pressure), preferably from 0.5 to 10 kPa (absolute pressure). The temperature of the evaporator is, for example, preferably from 90 to 120° C. The crude 1,3-butylene glycol stream containing a low boiling point substance distilled off from the top of the column is fed to the product distillation column (product column) F.

Note that the alkaline reactor D and the dealkalization column E may be installed between the desalting column B and the high boiling point component removal column C, between the dehydration column A and the desalting column B (in this case, the desalting column may also serve as a dealkalization column), or before the dehydration column A. In addition, without providing the alkaline reactor D or the dealkalization column E, the alkaline treatment can be performed by charging the base into a high boiling point component removal column charging line or into a dehydration column charging line, or adding the base to the reaction solution after the hydrogenation [and then charging the base into the dealcoholization column (low boiling point component removal column)].

In the production method according to the present disclosure, in the product column F for use in the product distillation, a charged liquid containing 1,3-butylene glycol is distilled under a condition of a reflux ratio of greater than 0.1, a liquid in which a low boiling point component is concentrated is distilled off from above the charging plate (corresponding to "X-6" in FIGS. 1), and 1,3-butylene glycol is extracted from below the charging plate (corresponding to "Y" in FIG. 1). The 1,3-butylene glycol has a very low content of the low boiling component and a high initial boiling point, and thus can be made into a 1,3-butylene glycol product as it is.

The product distillation column F can be, for example, a perforated-plate column, a bubble column, or the like, but is more preferably a packed column with a low pressure loss, filled with Sulzer Packing, Melapack (trade names of Sumitomo Heavy Industries, Ltd.). This is because 1,3-butylene glycol and trace impurities would be thermally decomposed at a high temperature (e.g., 150° C. or higher) and form a low boiling point substance, which is a coloring component. Thus, the distillation temperature is to be lowered. In addition, this is also because a long thermal history (residence time) for 1,3-butylene glycol would also have a similar effect. Thus, the reboiler employed is preferably one with a short residence time of the process side fluid, for example, a thin-film evaporator, such as a natural downward flow thin-film evaporator or a forced-stirring thin-film evaporator.

A theoretical number of plates of the product column F is, for example, from 1 to 100 plates, preferably from 2 to 90 plates, from 3 to 80 plates, from 4 to 70 plates, from 5 to 60 plates, from 8 to 50 plates, or from 10 to 40 plates, and more preferably from 15 to 30 plates. A feed position for the charged liquid is, for example, from 10 to 90%, preferably from 20 to 80%, and more preferably from 30 to 70%, and even more preferably from 40 to 60% of the height of the column downward from the top of the column. In the distillation in the product distillation column F, a pressure (absolute pressure) at the top of the column is, for example, from 20 kPa or less, preferably from 0.1 to 10 kPa, more preferably from 0.3 to 8 kPa, even more preferably from 0.5 to 5 kPa.

In FIG. 1, in charging to the product column F, the column top vapor from the dealkalization column E is condensed in the condenser E-1, and the resulting condensed liquid is fed, but the column top vapor from the dealkalization column E may be directly fed to the product column F.

The concentration of 1,3-butylene glycol in the charged liquid into the product column F is, for example, 90% or greater, preferably 91% or greater, more preferably 92% or greater, even more preferably 93% or greater, 94% or greater, 95% or greater, 96% or greater, 97% or greater, or 98% or greater, and particularly preferably 99% or greater. The concentration of 1,3-butylene glycol in the charged liquid into the product column F can be improved, for example, by adjusting the distillation condition of the dehydration column A, providing a dealcoholization column (low boiling point component removal column) before the dehydration column A, and adjusting the distillation condition thereof, or adjusting the distillation condition of the high boiling point component removal column C. For example, it is possible to increase the purity of 1,3-butylene glycol in charged liquid into the product column F by increasing the reflux ratio of the dealcoholization column (low boiling point component removal column), the dehydration column A, and/or the high boiling point component removal column C or increasing the number of plates. Note that the concentration of 1,3-butylene glycol is an area proportion (area %) of the 1,3-butylene glycol peak relative to the total peak area in the gas chromatographic analysis of the following conditions, in which the conditions for the gas chromatographic analysis are as follows:

Analytical Column: a column with dimethylpolysiloxane as a stationary phase, having a length of 30 m, an inner diameter of 0.25 mm, and a film thickness of 1.0 μm Heating conditions: heating from 80° C. to 120° C. at 5° C./min, then heating again to 160° C. at 2° C./min and maintaining for 2 minutes, and further heating to 230° C. at 10° C./min and maintaining at 230° C. for 18 minutes Sample Introduction Temperature: 250° C.

Carrier Gas: helium

Column Gas Flow Rate: 1 mL/min

Detector and Detection Temperature: a flame ionization detector (FID), 280° C.

In the production method according to the present disclosure, the content of water in the charged liquid into the product column F is, for example, 3 wt. % or less, preferably 2.8 wt. % or less, more preferably 2.6 wt. % or less, 2.4 wt. % or less, 2.2 wt. % or less, 2 wt. % or less, 1.8 wt. % or less, 1.6 wt. % or less, 1.4 wt. % or less, 1.4 wt. % or less, 1.2 wt. % or less, 1 wt. % or less, 0.95 wt. % or less, 0.9 wt. % or less, 0.8 wt. % or less, 0.7 wt. % or less, 0.6 wt. % or less, 0.5 wt. % or less, 0.4 wt. % or less, 0.3 wt. % or less, or 0.2 wt. % or less, and particularly preferably 0.1 wt. % or less. The content of water in the charged liquid into the product column F can be reduced by adjusting the distillation condition of the dehydration column A. For example, increasing the reflux ratio, the number of plates, and the distillation ratio in the dehydration column A can reduce the concentration of water in the charged liquid into the product column F. Note that the water content of the charged liquid into the product column F can be quantified by the Karl Fischer water content measurement instrument.

The content of the low boiling point component (excluding water) in the charged liquid into the product column F is, for example, 1.8% or less, preferably 1.6% or less, 1.4% or less, 1.2% or less, 1.1% or less, 1% or less, 0.9% or less, 0.8% or less, 0.7% or less, 0.6% or less, or 0.5% or less, and more preferably 0.4% or less. The content of the low boiling point component (also referred to as "low boiling point substance") excluding water in the charged liquid into the product column F is a total area proportion (area %) of peaks shorter in retention time than the 1,3-butylene glycol peak relative to the total peak area in the gas chromatographic analysis under the above conditions. The content of the low boiling point component (excluding water) in the charged liquid into the product column F can be reduced, for example, by providing a dealcoholization column (low boiling point component removal column) upstream of the product column F, and adjusting the distillation condition of the dealcoholization column (low boiling point component removal column). For example, increasing the reflux ratio, the number of plates, and the distillation ratio in the dealcoholization column (low boiling point component removal column) can reduce the content of the low boiling point component (excluding water) in the charged liquid into the product column F.

In the production method according to the present disclosure, the reflux ratio in the product column F [product column reflux amount/product column distilled amount)] is greater than 0.1 (for example, 0.15 or greater). The reflux ratio is preferably 0.2 or greater, more preferably 0.3 or greater, even more preferably 0.4 or greater, 0.5 or greater, 1 or greater, 2 or greater, 3 or greater, 4 or greater, 5 or greater, 6 or greater, 7 or greater, 8 or greater, 9 or greater, 10 or greater, 20 or greater, or 50 or greater, and particularly preferably 400 or greater (for example, 500 or greater), from the perspective of increasing the initial boiling point of the 1,3-butylene glycol product.

In the production method according to the present disclosure, the reflux ratio in the product column F is within the specified range described above, and thus high-purity 1,3-butylene glycol having a very low content of the low boiling point component and a high initial boiling point can be produced, with a high recovery ratio.

In the production method according to the present disclosure, the distillation ratio in the product column F is, for example, less than 30 wt. %, less than 29 wt. %, less than 28 wt. %, less than 27 wt. %, less than 26 wt. %, less than 25 wt. %, less than 24 wt. %, less than 23 wt. %, less than 22 wt. %, less than 21 wt. %, or less than 20 wt. %, more preferably 19 wt. % or less, 18 wt. % or less, 17 wt. % or less, 16 wt. % or less, or 15 wt. % or less, even more preferably 12 wt. % or less, 10 wt. % or less, 8 wt. % or less, 5 wt. % or less, 3 wt. % or less, 2 wt. % or less, 1 wt. % or less, 0.8 wt. % or less, or 0.6 wt. % or less, and particularly preferably 0.4 wt. % or less, from the perspective of improving the recovery ratio of 1,3-butylene glycol. Note that the distillation ratio refers to a proportion (wt. %) of an amount of liquid extracted from above the charging plate of the product column F (for example, the top of the column) to the outside of the distillation column (this amount including also the recycled amount of liquid when recycled to the previous step which will be described below) with respect to a charged amount into the product column F.

At least a portion of the liquid (hereinafter, sometimes referred to as "distillate") in which the low boiling point component is concentrated, which is extracted from above the charging plate of the product column F, may be recycled to the step prior to the performing product distillation (dashed arrow illustrated on the right side of the product column F in FIG. 1). The recovery ratio of 1,3-butylene glycol can be improved by recycling at least a portion of the distillate to the step prior to the performing product distillation.

Examples of the step prior to the performing product distillation include dehydration and dealcoholization (low boiling point component removal). Note that the dealcoholization (low boiling point component removal) is preferably provided before the dehydration.

The recycled amount of the distillate recycled to the step prior to performing the product distillation can be appropriately selected within the range of the amount of distillate. The recycled amount of the distillate recycle to the step prior to performing the product distillation is, for example, less than 30 wt. % with respect to the charged amount into the product column F. Also, from the perspective of improving the 1,3 BG recovery ratio in the product column and the yield throughout the entire process, the recycled amount of the distillate recycled to the step prior to the performing product distillation is, for example, 0.01 wt. % or greater, preferably 0.05 wt. % or greater, more preferably 0.1 wt. % or greater, 0.5 wt. % or greater, 1 wt. % or greater, 1.5 wt. % or greater, 2 wt. % or greater, 3 wt. % or greater, 4 wt. % or greater, 5 wt. % or greater, 7 wt. % or greater, or 10 wt. % or greater, and particularly preferably 20 wt. % or greater with respect to the charged amount into the product column F.

Thus, according to the production method of the present disclosure, it is possible to produce high-purity 1,3-butylene glycol having a very low content of the low boiling point component and a high initial boiling point, with a high recovery ratio. Note that, in the present specification, the recovery ratio of 1,3 BG in the product column F is a value (%) determined by the following formula. {1−[GC area % of 1,3 BG in distillate]×(distilled amount (part)-recycled amount (part) of distillate]/(GC area % of 1,3 BG in charged liquid×charged amount (part)}×100

Note that the low boiling point substance and the high boiling point substance may be hydrolyzed by water to produce 1,3 BG, while the high boiling point substance may be produced by polymerization of 1,3 BG. Further, due to the formation or disappearance of trace impurities, the mass balance in the product column may not always be ensured. This applies to the dealcoholization column (low boiling point component removal column), the dehydration column, the high boiling point component removal column, and other distillation columns.

1,3-Butylene glycol product

The 1,3-butylene glycol product according to the present disclosure can be produced by the producing method according to the present disclosure described above. The 1,3-butylene glycol product according to the present disclosure has an initial boiling point higher than 203° C. and a water content of less than 0.4 wt. %. The initial boiling point is preferably 204° C. or higher, more preferably 205° C. or higher, even more preferably 206° C. or higher or 207° C., and particularly preferably 208° C. or higher. The content of water is preferably 0.3 wt. % or less, more preferably 0.2 wt. % or less, even more preferably 0.1 wt. % or less, 0.07 wt. % or less, 0.05 wt. % or less, 0.03 wt. % or less, 0.02 wt. % or less, or 0.01 wt. % or less, and particularly preferably 0.005 wt. % or less. Note that the content of water can be quantified by a Karl Fischer water content analyzer.

The 1,3-butylene glycol product according to the present disclosure preferably has, in a gas chromatographic analysis (GC analysis) performed under conditions set forth below:
an area ratio of a 1,3-butylene glycol peak of greater than 98.5% and a total area ratio of peaks shorter in retention time than the 1,3-butylene glycol peak of less than 0.3%,
in which the conditions for the gas chromatographic analysis are as follows:
Analytical Column: a column with dimethylpolysiloxane as a stationary phase, having a length of 30 m, an inner diameter of 0.25 mm, and a film thickness of 1.0 μm
Heating conditions: heating from 80° C. to 120° C. at 5° C./min, then heating again to 160° C. at 2° C./min and maintaining for 2 minutes, and further heating to 230° C. at 10° C./min and maintaining at 230° C. for 18 minutes
Sample Introduction Temperature: 250° C.
Carrier Gas: helium
Column Gas Flow Rate: 1 mL/min
Detector and Detection Temperature: a flame ionization detector (FID), 280° C.

The area ratio of the 1,3-butylene glycol peak is preferably 98.6% or greater, more preferably 98.7% or greater, even more preferably 98.8% or greater, 98.9% or greater, 99% or greater, 99.1% or greater, 99.2% or greater, or 99.3% or greater, 99.4% or greater, 99.5% or greater, 99.6% or greater, or 99.7% or greater, and particularly preferably 99.8% or greater.

The total area ratio of the peaks shorter in retention time than the 1,3-butylene glycol peak is preferably, 0.25% or less, more preferably 0.23% or less, even more preferably 0.2% or less, 0.17% or less, 0.15% or less, 0.12% or less, 0.1% or less, 0.07% or less, 0.04% or less, 0.03% or less, 0.02% or less, 0.01% or less, or 0.007% or less, and particularly preferably 0.005% or less (for example, 0.002% or less).

In the present disclosure, the "(peak) area ratio" means an area proportion (area %) of a specific peak relative to the sum of the areas of all peaks appearing in the chromatogram. In addition, all peaks mean, for example, all of the peaks appearing in the analysis continued until and discontinued at a relative retention time of 7.8, provided that the relative retention time of 1,3-butylene glycol is 1.0.

The area ratio of the 1,3-butylene glycol peak and the total area ratio of the peaks shorter in retention time than the 1,3-butylene glycol peak are within the ranges described above, and thus high-purity and high-quality 1,3-butylene glycol products are provided.

Moisturizer and Cosmetic Product

A moisturizer of the present disclosure contains the 1,3-butylene glycol product described above. Therefore, the moisturizer has excellent moisturizing performance. The moisturizer of the present disclosure may contain a component besides the 1,3-butylene glycol product described above, such as a moisturizer component besides the 1,3-butylene glycol product described above. In the moisturizer of the present disclosure, the content of the 1,3-butylene glycol product described above is, for example, 10 wt. % or greater, preferably 30 wt. % or greater, more preferably 50 wt. % or greater, even more preferably 80 wt. % or greater, and particularly preferably 90 wt. % or greater, and the moisturizer may be composed of only the 1,3-butylene glycol product described above.

A cosmetic of the present disclosure contains the moisturizer described above. The blending amount of the 1,3-butylene glycol product in the cosmetic product of the present disclosure is any amount in which the moisturizing performance can be exhibited according to the type and form of cosmetic. The blending amount of the 1,3-butylene glycol product in the cosmetic product of the present disclosure is, for example, from 0.01 to 40 wt. %, preferably from 0.1 to 30 wt. %, more preferably from 0.2 to 20 wt. %, even more preferably from 0.5 to 15 wt. %, and particularly preferably from 1 to 10 wt. %.

The cosmetic product of the present disclosure may contain, in addition to the 1,3-butylene glycol product, for example, another moisturizer; an oil, such as a vegetable oil, a hydrocarbon oil, a higher fatty acid, a higher alcohol, or a silicone; a surfactant, such as an anionic surfactant, a cationic surfactant, an amphoteric surfactant, or a nonionic surfactant; a preservative, a sequestrant, a thickener, a powder, an ultraviolet absorber, an ultraviolet blocker, a fragrance, or a pH adjuster; or a medicinal ingredient or bioactive component, such as a vitamin preparation, a skin activator, a blood circulation promoter, a skin-lightening preparation, an antibacterial agent, or an anti-inflammatory agent.

The cosmetic product of the present disclosure can be a skin cosmetic product, such as a lotion, an emulsion, a cream, a gel, a pack, or a mask; or a hair cosmetic product, such as a shampoo, a rinse, or a hair restorer. In addition, the cosmetic product may be a sunscreen cosmetic product, a make-up cosmetic product or the like. Furthermore, the cosmetic product can be a pharmaceutical product or quasi drug containing a medical component.

The cosmetic product of the present disclosure can be produced by utilizing a method known per se.

Each aspect disclosed in the present specification can be combined with any other feature disclosed herein. Note that each of the configurations, combinations thereof, and the like in each of the embodiments are an example, and various additions, omissions, and other changes may be made as appropriate without departing from the spirit of the present disclosure. The present disclosure is not limited by the embodiments and is limited only by the claims.

EXAMPLES

Hereinafter, the present disclosure will be described more specifically with reference to examples, but the present disclosure is not limited by these examples. "Parts" used in the examples means "parts by weight" unless otherwise specified. Gas chromatographic analysis (GC analysis), measurement of an initial boiling point, and measurement of water content were performed by the methods which will be described below.

Example 1

The method of producing 1,3-butylene glycol will be described using FIG. 1.

Relative to 100 parts of an acetaldol solution containing 30 wt. % of water (mixed solution of 69 parts of acetaldol and 29 parts of water, containing a total of 2 parts of a low boiling and a high boiling point impurities, Na salt: less than 0.1 parts) as a raw material, 10 parts of hydrogen were charged in a reactor for liquid-phase hydrogen reduction, and 15 parts of Raney nickel were added as a catalyst. The reactor was kept at 120° C. and 10 MPa (gauge pressure), and liquid-phase hydrogen reduction was performed. After the catalyst was separated, the liquid after the reaction was neutralized with sodium hydroxide, and crude 1,3-butylene glycol (1) containing low boiling point impurities and water was obtained.

Note that the acetaldol solution containing 30 wt. % of water, which was used as the raw material, had been produced by stirring acetaldehyde and water in the presence of 100 ppm by weight NaOH at 30° C. for a residence time of 10 hours, and dimerizing the acetaldehyde [acetaldehyde polymerization (aldol condensation of acetaldehyde)].

The crude 1,3-butylene glycol (1) (corresponding to "X-1" in FIG. 1) was charged in the dehydration column A. In the dehydration column A, water was extracted from the top of the column, and 15 parts of fresh water was added as reflux water relative to 100 parts of the charged liquid amount. The pressure at the top of the column was adjusted to 7 kPa (absolute pressure), and crude 1,3-butylene glycol (2) was produced from the bottom of the column, the crude 1,3-butylene glycol (2) having a total area ratio of impurity peaks shorter in retention time (RT) than 1,3-butylene glycol of 1.8% in the GC analysis which will be described later. The water extracted from the top of the column was discharged (corresponding to "X-2" in FIG. 1).

The crude 1,3-butylene glycol (2) was then charged in the desalting column B. In the desalting column B, a salt, a high boiling point substance, and a portion of 1,3-butylene glycol were discharged as the evaporation residue from the bottom of the column (corresponding to "X-3" in FIG. 1). The discharge amount of the evaporation residue was 5 parts relative to 100 parts of the charged liquid amount. On the other hand, from the top of the column, the crude 1,3-butylene glycol (3) containing 1,3-butylene glycol, a low boiling point substance, and a portion of a high boiling point substance was produced.

The crude 1,3-butylene glycol (3) was then charged in the high boiling point component removal column C. In the high boiling point component removal column C, distillation was performed under the condition of a pressure at the top of the column of 5 kPa (absolute pressure), and a high boiling point substance and a portion of 1,3-butylene glycol were discharged from the bottom of the column (corresponding to "X-4" in FIG. 1). The discharge amount from the bottom of the column was 20 parts relative to 100 parts of the charged liquid amount. On the other hand, 80 parts of crude 1,3-butylene glycol (4) containing a low boiling point substance was obtained, as a distillate, from the top of the column.

The crude 1,3-butylene glycol (4) was then charged in the alkaline reactor D. At this time, a 20 wt. % sodium hydroxide aqueous solution was added to give a concentration of sodium hydroxide of 0.1 wt. % relative to the charged liquid. The reaction temperature was maintained at 120° C. in the alkaline reactor D, and a reaction was performed at a residence time of 20 minutes.

A reaction crude liquid exiting the alkaline reactor D was then charged in the dealkalization column E. In the dealkalization column E, sodium hydroxide, a high boiling point substance, and a portion of 1,3-butylene glycol were discharged from the bottom of the column (corresponding to "X-5" in FIG. 1). The discharge amount from the bottom of the column was 5 parts relative to 100 parts of the charged liquid amount. On the other hand, from the top of the column were produced 95 parts of crude 1,3-butylene glycol (5) containing 1,3-butylene glycol and a low boiling point substance. The crude 1,3-butylene glycol (5) containing 1,3-butylene glycol and a low boiling point substance was measured for water content, and subjected to GC analysis and GC-MS analysis. As a result, the water concentration was 1.2 wt. %, the area ratio of 1,3-butylene glycol was 97%, and the total area ratio of impurity peaks shorter in retention time than 1,3-butylene glycol was 1.8%.

The crude 1,3-butylene glycol (5) was then charged in the product distillation column F. In the product distillation column F, 10 parts of a low boiling point substance and a portion of 1,3-butylene glycol relative to 100 parts of the charged liquid amount were distilled off from the top of the column (corresponding to "X-6" in FIG. 1), and the entire amount was discharged to the outside of the system. The operation was performed at a reflux ratio (reflux amount/distilled amount) of 0.3, and 90 parts of a 1,3-butylene glycol product was obtained from the bottom of the column (distillation ratio: 10 wt. %) (corresponding to "Y" in FIG. 1).

As a result of the measurement of the initial boiling point, the measurement of water content, and the GC analysis for the 1,3-butylene glycol product, the initial boiling point was 203.3° C., the water concentration was 0.2 wt. %, the area ratio of 1,3-butylene glycol was 98.6%, and the total area ratio of impurity peaks shorter in retention time than 1,3-butylene glycol was 0.2% (1,3-butylene glycol retention time: 6.5 minutes). The 1,3-butylene glycol recovery ratio in the product column F was 92%.

Example 2

Ninety three (93) parts of a 1,3-butylene glycol product was obtained from the bottom of the product column F by the same method as in Example 1 except that the reflux ratio of the product column F was changed to 1. As a result of the measurement of the initial boiling point, the measurement of water content, and the GC analysis for the 1,3-butylene glycol product, the initial boiling point was 206.8° C., the water concentration was 0.1 wt. %, the area ratio of 1,3-butylene glycol was 98.7%, and the total area ratio of impurity peaks shorter in retention time than 1,3-butylene glycol was 0.09%. The 1,3-butylene glycol recovery ratio in the product column F was 92%.

Example 3

Ninety (90) parts of a 1,3-butylene glycol product was obtained (distillation ratio: 10 wt. %) from the bottom of the product column F by the same method as in Example 1, except that the reflux ratio of the product column F was 1, and that the entire amount of the distillate from the product column F, which was extracted to the outside of the system, was recycled to the charging line of the dehydration column A. As a result of the measurement of the initial boiling point, the measurement of water content, and the GC analysis for the 1,3-butylene glycol product, the initial boiling point was 206.7° C., the water concentration was 0.1 wt. %, the area ratio of 1,3-butylene glycol was 98.7%, and the total area ratio of impurity peaks shorter in retention time than 1,3-butylene glycol was 0.09%. The 1,3-butylene glycol recovery ratio in the product column F was 99% or greater.

Example 4

Ninety (90) parts of a 1,3-butylene glycol product was obtained from the bottom of the product column F by the same method as in Example 3 except that the reflux ratio of the product column F was 10. As a result of the measurement of the initial boiling point, the measurement of water content, and the GC analysis for the 1,3-butylene glycol product, the initial boiling point was 208.2° C., the water concentration was 0.01 wt. %, the area ratio of 1,3-butylene glycol was 98.8%, and the total area ratio of impurity peaks shorter in retention time than 1,3-butylene glycol was 0.03%. The 1,3-butylene glycol recovery ratio in the product column F was 99% or greater.

Example 5

Ninety (90) parts of a 1,3-butylene glycol product was obtained from the bottom of the product column F by the same method as in Example 3 except that the reflux ratio of the product column F was 20. As a result of the measurement of the initial boiling point, the measurement of water content, and the GC analysis for the 1,3-butylene glycol product, the initial boiling point was 208.3° C., the water concentration was 0.008 wt. %, the area ratio of 1,3-butylene glycol was 98.8%, and the total area ratio of impurity peaks shorter in retention time than 1,3-butylene glycol was 0.009%. The 1,3-butylene glycol recovery ratio in the product column F was 99% or greater.

Example 6

Ninety (90) parts of a 1,3-butylene glycol product was obtained from the bottom of the product column F by the same method as in Example 3 except that the reflux ratio of the product column F was 50. As a result of the measurement of the initial boiling point, the measurement of water content, and the GC analysis for the 1,3-butylene glycol product, the initial boiling point was 208.3° C., the water concentration was 0.006 wt. %, the area ratio of 1,3-butylene glycol was 98.8%, and the total area ratio of impurity peaks shorter in retention time than 1,3-butylene glycol was 0.007%. The 1,3-butylene glycol recovery ratio in the product column F was 99% or greater.

Example 7

The same operation as in Example 3 was performed except that a liquid having a water concentration of 0.4 wt. %, an area ratio of 1,3-butylene glycol of 98%, and a total area ratio of impurity peaks shorter in retention time than 1,3-butylene glycol of 0.7% was used as the charged liquid into the product column F, that the reflux ratio of the product column F was 1, and that 99 parts of a 1,3-butylene glycol product was obtained from the bottom of the product column F (distillation ratio: 1 wt. %). As a result of the measurement of the initial boiling point, the measurement of water content, and the GC analysis for the 1,3-butylene glycol product, the initial boiling point was 206.9° C., the water concentration was 0.1 wt. %, the area ratio of 1,3-butylene glycol was 98.6%, and the total area ratio of impurity peaks shorter in retention time than 1,3-butylene glycol was 0.07%. The 1,3-butylene glycol recovery ratio in the product column F was 99% or greater.

Example 8

The same operation as in Example 7 was performed except that the reflux ratio of the product column F was 5. As a result of the measurement of the initial boiling point, the measurement of water content, and the GC analysis for the 1,3-butylene glycol product, the initial boiling point was 208.3° C., the water concentration was 0.008 wt. %, the area ratio of 1,3-butylene glycol was 98.7%, and the total area ratio of impurity peaks shorter in retention time than 1,3- butylene glycol was 0.009%. The 1,3-butylene glycol recovery ratio in the product column F was 99% or greater.

Example 9

The same operation as in Example 7 was performed except that the reflux ratio of the product column F was 10. As a result of the measurement of the initial boiling point, the measurement of water content, and the GC analysis for the 1,3-butylene glycol product, the initial boiling point was 208.3° C., the water concentration was 0.006 wt. %, the area ratio of 1,3-butylene glycol was 98.7%, and the total area ratio of impurity peaks shorter in retention time than 1,3-butylene glycol was 0.007%. The 1,3-butylene glycol recovery ratio in the product column F was 99% or greater.

Example 10

The same operation as in Example 7 was performed except that the reflux ratio of the product column F was 100. As a result of the measurement of the initial boiling point, the measurement of water content, and the GC analysis for the 1,3-butylene glycol product, the initial boiling point was 208.3° C., the water concentration was 0.005 wt. %, the area ratio of 1,3-butylene glycol was 98.7%, and the total area ratio of impurity peaks shorter in retention time than 1,3-butylene glycol was 0.005%. The 1,3-butylene glycol recovery ratio in the product column F was 99% or greater.

Example 11

The same operation as in Example 7 was performed except that the reflux ratio of the product column F was 500. As a result of the measurement of the initial boiling point, the measurement of water content, and the GC analysis for the 1,3-butylene glycol product, the initial boiling point was 208.4° C., the water concentration was 0.004 wt. %, the area ratio of 1,3-butylene glycol was 98.7%, and the total area ratio of impurity peaks shorter in retention time than 1,3-butylene glycol was 0.004%. The 1,3-butylene glycol recovery ratio in the product column F was 99% or greater.

Example 12

The same operation as in Example 3 was performed except that a liquid having a water concentration of 0.1 wt. %, an area ratio of 1,3-butylene glycol of 99%, and a total area ratio of impurity peaks shorter in retention time than 1,3-butylene glycol of 0.6% was used as the charged liquid into the product column F, that the reflux ratio of the product column F was 10, and that 99.7 parts of a 1,3-butylene glycol product was obtained from the bottom of the product column F (distillation ratio: 0.3 wt. %). As a result of the measurement of the initial boiling point, the measurement of water content, and the GC analysis for the 1,3-butylene glycol product, the initial boiling point was 208.2° C., the water concentration was 0.01 wt. %, the area ratio of 1,3-butylene glycol was 99.5%, and the total area ratio of impurity peaks shorter in retention time than 1,3-butylene glycol was 0.1%. The 1,3-butylene glycol recovery ratio in the product column F was 99% or greater.

Example 13

The same operation as in Example 3 was performed except that a liquid having a water concentration of 3 wt. %, an area ratio of 1,3-butylene glycol of 99%, and a total area ratio of impurity peaks shorter in retention time than 1,3-butylene glycol of 0.8% was used as the charged liquid into the product column F, that the reflux ratio of the product column F was 10, and that 90 parts of a 1,3-butylene glycol product was obtained from the bottom of the product column F (distillation ratio: 10 wt. %). As a result of the measurement of the initial boiling point, the measurement of water content, and the GC analysis for the 1,3-butylene glycol product, the initial boiling point was 206.7° C., the water concentration was 0.1 wt. %, the area ratio of 1,3-butylene glycol was 99.4%, and the total area ratio of impurity peaks shorter in retention time than 1,3-butylene glycol was 0.02%. The 1,3-butylene glycol recovery ratio in the product column F was 99% or greater.

Comparative Example 1

The same operation as in Example 1 was performed except that the reflux ratio of the product column F was 0.05, and that 80 parts of a 1,3-butylene glycol product was obtained from the bottom of the product column F (distillation ratio: 20 wt. %). As a result of the measurement of the initial boiling point, the measurement of water content, and the GC analysis for the 1,3-butylene glycol product, the initial boiling point was 194.6° C., the water concentration was 0.6 wt. %, the area ratio of 1,3-butylene glycol was 98.5%, and the total area ratio of impurity peaks shorter in retention time than 1,3-butylene glycol was 0.3%. The 1,3-butylene glycol recovery ratio in the product column F was 82%.

Comparative Example 2

The same operation as in Example 1 was performed except that the reflux ratio of the product column F was 0.1, and that 80 parts of a 1,3-butylene glycol product was obtained from the bottom of the product column F (distillation ratio: 20 wt. %). As a result of the measurement of the initial boiling point, the measurement of water content, and the GC analysis for the 1,3-butylene glycol product, the initial boiling point was 199.0° C., the water concentration was 0.4 wt. %, the area ratio of 1,3-butylene glycol was 98.6%, and the total area ratio of impurity peaks shorter in retention time than 1,3-butylene glycol was 0.2%. The 1,3-butylene glycol recovery ratio in the product column F was 82%.

Reference Example 1

The same operation as in Example 1 was performed except that the reflux ratio of the product column F was 0.1, and that 70 parts of a 1,3-butylene glycol product was obtained from the bottom of the product column F (distillation ratio: 30 wt. %). As a result of the measurement of the initial boiling point, the measurement of water content, and the GC analysis for the 1,3-butylene glycol product, the initial boiling point was 203.1° C., the water concentration was 0.2 wt. %, the area ratio of 1,3-butylene glycol was 98.7%, and the total area ratio of impurity peaks shorter in retention time than 1,3-butylene glycol was 0.1%. The 1,3-butylene glycol recovery ratio in the product column F was 72%.

Gas Chromatographic Analysis

Figure 2:
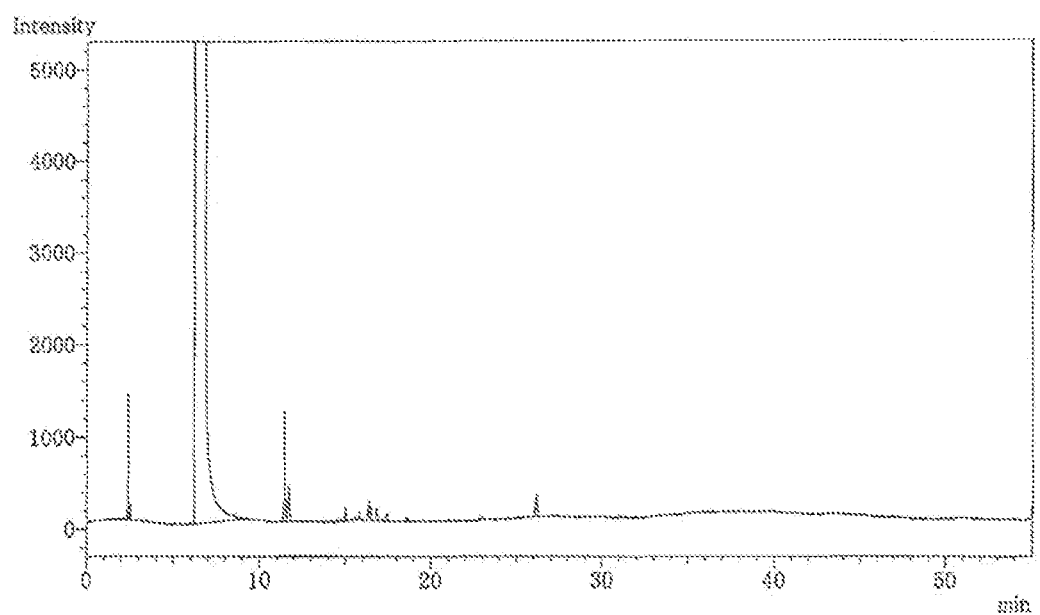
FIG. 2 is a chromatogram showing a chart for gas chromatographic analysis of a 1,3-butylene glycol product in Example 12.
Figure 3:
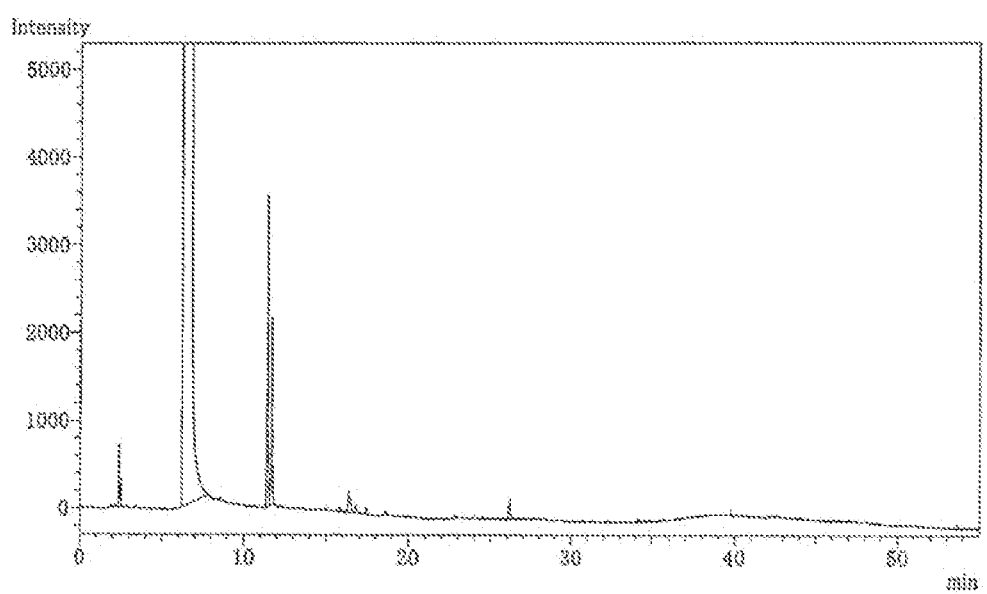
FIG. 3 is a chromatogram showing a chart for gas chromatographic analysis of a 1,3-butylene glycol product in Comparative Example 2.

A gas chromatographic analysis of the target 1,3-butylene glycol product was performed under the conditions below. A chromatogram of the gas chromatographic analysis of the 1,3-butylene glycol product in Example 12 is illustrated in FIG. 2. In addition, a chromatogram of the gas chromatographic analysis of the 1,3-butylene glycol product in Comparative Example 2 is illustrated in FIG. 3.
in which the conditions for the gas chromatographic analysis are as follows:
  Analytical Instrument: Shimadzu GC 2010
  Analytical Column: column with dimethylpolysiloxane as a stationary phase having a film thickness of 1.0 µm, a length of 30 m, and an inner diameter of 0.25 mm (Agilent J&W GC column-DB-1 available from Agilent Technologies Japan, Ltd.)
  Heating conditions: heating from 80° C. to 120° C. at 5° C./min, then heating again to 160° C. at 2° C./min and maintaining for 2 minutes, and further heating to 230° C. at 10° C./min and maintaining at 230° C. for 18 minutes
  Sample Introduction and Temperature: split sample introduction, 250° C.
  Gas Flow Rate of Split and Carrier Gas: 23 mL/min, helium
  Column Gas Flow Rate and Carrier Gas: 1 mL/min, helium
  Detector and Temperature: a flame ionization detector (FID), 280° C.
  Injection Sample: 0.2 µL of a 80 wt. % 1,3-butylene glycol product aqueous solution
Measurement of Initial Boiling Point
  The test was conducted according to the test method specified in the normal pressure distillation test method of JIS K2254 "Petroleum products-distillation test method".
Measurement of Water Content
  Water content was measured by a Karl Fischer water content measurement instrument.

Considerations of Results

The results of the above comparative examples, reference examples and examples are shown in Tables 1 and 2.

TABLE 1

| | | Comparative Example 1 | Comparative Example 2 | Reference Example 1 | Example 1 | Example 2 | Example 3 | Example 4 | Example 5 | Example 6 |
|---|---|---|---|---|---|---|---|---|---|---|
| Charge into product column F | Part | 100 | ← | ← | ← | ← | ← | ← | ← | ← |
| | 1,3 BG GC area % | 97 | ← | ← | ← | ← | ← | ← | ← | ← |
| | Water wt. % | 1.2 | ← | ← | ← | ← | ← | ← | ← | ← |
| | Low boiling point substance GC area % | 1.8 | ← | ← | ← | ← | ← | ← | ← | ← |
| Reflux ratio of product column F | | 0.05 | 0.1 | 0.1 | 0.3 | 1 | 1 | 10 | 20 | 50 |
| Distillation from product column F | Part | 20 | 20 | 30 | 10 | 10 | 10 | 10 | 10 | 10 |
| | Recycle | Absent | Absent | Absent | Absent | Absent | Present | Present | Present | Present |
| Bottom (product) from product column F | Part | 80 | 80 | 70 | 90 | 90 | 90 | 90 | 90 | 90 |
| | 1,3 BG GC area % | 98.5 | 98.6 | 98.7 | 98.6 | 98.7 | 98.7 | 98.8 | 98.8 | 98.8 |
| | Water wt. % | 0.6 | 0.4 | 0.2 | 0.2 | 0.1 | 0.1 | 0.01 | 0.008 | 0.006 |
| | Low boiling point substance GC area % | 0.3 | 0.2 | 0.1 | 0.2 | 0.09 | 0.09 | 0.03 | 0.009 | 0.007 |
| | Initial boiling point ° C. | 194.6 | 199.0 | 203.1 | 203.3 | 206.8 | 206.7 | 208.2 | 208.3 | 208.3 |
| | 1,3 BG recovery ratio % | 82 | 82 | 72 | 92 | 92 | 99 or greater | 99 or greater | 99 or greater | 99 or greater |

TABLE 2

| | | Example 7 | Example 8 | Example 9 | Example 10 | Example 11 | Example 12 | Example 13 |
|---|---|---|---|---|---|---|---|---|
| Charge into product column F | Part | 100 | ← | ← | ← | ← | 100 | 100 |
| | 1,3 BG GC area % | 98 | ← | ← | ← | ← | 99 | 99 |
| | Water wt. % | 0.4 | ← | ← | ← | ← | 0.1 | 3 |
| | Low boiling point substance GC area % | 0.7 | ← | ← | ← | ← | 0.6 | 0.8 |
| Reflux ratio of product column F | | 1 | 5 | 10 | 100 | 500 | 10 | 10 |
| Distillation from product column F | Part | 1 | 1 | 1 | 1 | 1 | 0.3 | 10 |
| | Recycle | Present | Present | Present | Present | Present | Present | Present |
| Bottom (product) from product column F | Part | 99 | 99 | 99 | 99 | 99 | 99.7 | 90 |
| | 1,3 BG GC area % | 98.6 | 98.7 | 98.7 | 98,7 | 98.7 | 99.5 | 99.4 |
| | Water wt. % | 0.1 | 0.008 | 0.006 | 0.005 | 0.004 | 0.01 | 0.1 |
| | Low boiling point substance GC area % | 0,07 | 0.009 | 0.007 | 0.005 | 0.004 | 0.1 | 0.02 |
| | Initial boiling point ° C. | 206.9 | 208.3 | 208.3 | 208,3 | 208.4 | 208.2 | 206.7 |
| | 1,3 BG recovery ratio % | 99 or greater | 99 or greater | 99 or greater | 99 or greater | 99 or greater | 99 or greater | 99 or greater |

From Comparative Examples 1 and 2, in the distillation ratio of 20 wt. %, the effect of removing water and low boiling point impurities was low, and the product initial boiling point was not satisfactory even when the reflux ratio is 0.1. In Reference Example 1, when the distillation ratio was 30 wt. %, in the reflux ratio of 0.1, the product initial boiling point was satisfactory, but the 1,3 BG recovery ratio in the product column was deteriorated, i.e., 72%, which is economically disadvantageous.

From Comparative Examples 1 to 2, Reference Example 1, and Example 1, when the reflux ratio of the product column was from 0.1 to 0.3, the amounts of water and the low boiling point component removed from the product column distillate were increased at a distillation ratio of 10 wt. % (recovery ratio: 92%). Therefore, the concentrations of water and the low boiling component in the product were reduced, and, as a result, the initial boiling point of the bottom (product) from the product column was improved. It can be seen that, even in a relatively low reflux ratio, the quality can be maintained with a certain degree of recovery ratio, when the charged composition (in particular, water, or water and the low boiling component), the reflux ratio, and the distilled amount are controlled.

From Examples 1 and 2, when the reflux ratio of the product column was changed from 0.3 to 1, the amounts of water and the low boiling component removed from the product column distillate were increased. Therefore, the concentrations of water and the low boiling component in the product were reduced, and, as a result, the initial boiling point of the product bottom (product) was improved.

In comparison of Examples 2 and 3, the product column distillate was recycled, and thus almost equivalent product quality was obtained when the 1,3 BG recovery ratio was improved. This is because the water and low boiling point impurities contained in the product column distillate were distilled off and removed, in almost entire amounts, in the dehydration column.

From Examples 3 to 6, when the reflux ratio was increased, the concentrations of water and the low boiling component in the product were further reduced, and the initial boiling point is improved.

From Examples 2 and 7, when the purity of the product charge was increased, and the concentrations of water and the low boiling component were reduced, the product quality was equivalent or improved even when the distilled amount was reduced. From Examples 7 to 11, it is clear that, when the reflux ratio is increased, the quality of the product is improved, but that, when the reflux ratio is increased to 500, the effect is reduced by the amount of energy increase due to the increase in reflux amount.

It is clear, from Examples 4, 9, and 12, that the product quality can be maintained even when the distilled amount and the purity in the charged liquid are changed under a constant reflux amount. It is clear that the reduction in recycled amount of the distillate is limited, though depending on the concentrations of water and impurities in the charged liquid, because the amounts of water and the impurities removed are extremely reduced if the amount of the distillate recycled is too low, but that the quality can be maintained as long as the distillation ratio is approximately 0.3 wt. %. As the recycled amount of the distillate is less, the amount of increase in facility size due to increase in treated amount due to the cycle to the previous step is reduced, and thus the amount of the distillate recycled is preferably as low as possible. However, it is desirable to determine an optimum value, taking into consideration the entire balance, the quality, and the like.

It can be seen, from Example 13, that, even when the concentration of water in the charged liquid into the product column is high, the product quality is satisfactory when the distilled amount and reflux ratio of the product column are high to a certain degree.

Note that, among 1,3-butylene glycol products obtained by known methods, there was no high-quality product having an initial boiling point of higher than 203° C. and a water content of less than 0.4 wt. %.

As a summary of the above, configurations and variations of the present disclosure are described below.

[1] A method for producing 1,3-butylene glycol to yield purified 1,3-butylene glycol from a reaction crude liquid containing 1,3-butylene glycol,
the method including: performing dehydration including removing water by distillation, removing a high boiling point component including removing a high boiling point component by distillation, and performing product distillation to yield purified 1,3-butylene glycol,
wherein, in a product column for use in the product distillation, a charged liquid containing 1,3-butylene glycol is distilled off under a condition that a reflux ratio is greater than 0.1 (or 0.15 or greater), a liquid in which a low boiling point component is concentrated is distilled off from above a charging plate, and 1,3-butylene glycol is extracted from below the charging plate.

[2] The method for producing 1,3-butylene glycol according to [1], wherein the reaction crude liquid containing 1,3-butylene glycol is a reaction crude liquid produced by hydrogen reduction of acetaldols (or a reaction crude liquid produced by hydrolysis of 1,3-butylene oxide, a reaction crude liquid produced by selective hydrocracking of erythritol, a reaction crude liquid produced by selective hydrogen addition to butadiene, a reaction crude liquid produced by hydrogen addition to n-butanal-3-one, a reaction crude liquid produced by hydrogen addition to 1-butanol-3-one, a reaction crude liquid produced by hydrogen addition to 3-hydroxy-1-butanoic acid, a reaction crude liquid produced by hydrogen addition to β-butyrolactone, or a reaction crude liquid produced by hydrogen addition to diketene.

[3] The method for producing 1,3-butylene glycol according to [2], wherein the acetaldols used as a raw material in reduction (hydrogenation) of the acetaldols is any of acetaldol; its cyclic dimer paraldol; aldoxane as a cyclic trimer of acetaldehyde; and mixtures of these.

[4] The method for producing 1,3-butylene glycol according to [2] or [3], wherein the reaction crude liquid containing acetaldols is subjected to simple evaporation, distillation, or hydrogen addition to remove aldehydes, followed by the hydrogenation.

[5] The method for producing 1,3-butylene glycol according to any one of [2] to [4], wherein a content of the acetaldols used as the raw material in reduction (hydrogenation) of the acetaldols is 30 wt. % or greater (e.g., from 30 to 99 wt. %) (or 40 wt. % or greater (e.g., from 40 to 98 wt. %), 50 wt. % or greater (e.g., from 50 to 97 wt. %), 60 wt. % or greater (e.g., from 60 to 95 wt. %), from 65 to 90 wt. %, from 70 to 90 wt. %, or 75 to 90 wt. %).

[6] The method for producing 1,3-butylene glycol according to any one of [2] to [5], wherein the raw material for reduction (hydrogenation) of the acetaldols contains water, and a content of the water is 2 wt. % or greater (or 5 wt. % or greater, 10 wt. % or greater, or 15 wt. % or greater), an upper limit of the water content is 90 wt. % (or 80 wt. %, 70 wt. %, 60 wt. %, 50 wt. %, 40 wt. %, 30 wt. %, or 20 wt. %).

[7] The method for producing 1,3-butylene glycol according to any one of [2] to [6], wherein an amount of a hydrogenation catalyst for reduction (hydrogenation) of the acetaldols is from 1 to 30 parts by weight (or from 4 to 25 parts by weight, from 8 to 20 parts by weight, or from 12 to 18 parts by weight) relative to 100 parts by weight of a raw material for hydrogenation.
- [8] The method for producing 1,3-butylene glycol according to any one of [2] to [7], wherein an amount of hydrogen used in a reduction (hydrogenation) reaction of the acetaldols is from 0.5 to 40 parts by weight (or from 1 to 30 parts by weight, from 5 4 to 20 parts by weight, or from 8 to 12 parts by weight) relative to 100 parts by weight of the raw material for hydrogenation.
- [9] The method for producing 1,3-butylene glycol according to any one of [2] to [8], wherein a pressure (total pressure, gauge pressure) in a reaction system in the reduction (hydrogenation) reaction of the acetaldols is from 9 to 70 MPa (or from 10 to 40 MPa).
- [10] The method for producing 1,3-butylene glycol according to any one of [2] to [9], wherein a hydrogen pressure (partial pressure of hydrogen) in the reaction system in the reduction (hydrogenation) reaction of the acetaldols is from 7 to 60 MPa 5 (or 10 to 30 MPa).
- [11] The method for producing 1,3-butylene glycol according to any one of [2] to [10], wherein a reaction temperature in the reduction (hydrogenation) reaction of the acetaldols is from 40 to 150° C. (or from 50 to 140° C., or from 60 to 130° C.).
- [12] The method for producing 1,3-butylene glycol according to any one of [2] to [11], wherein a reaction time (residence time) in the reduction (hydrogenation) reaction of the acetaldols is from 10 to 500 minutes (or from 20 to 400 minutes, from 30 to 300 minutes, from 50 to 280 minutes, or from 80 to 250 minutes).
- [13] The method for producing 1,3-butylene glycol according to any one of [1] to [12], further including dealcoholization for removing a low boiling point substance containing an alcohol in a process stream containing 1,3-butylene glycol.
- [14] The method for producing 1,3-butylene glycol according to any one of [1] to [13], further including desalting including removing a salt in the process stream containing 1,3-butylene glycol.
- [15] The method for producing 1,3-butylene glycol according to [14], wherein a bottom ratio (%) in the desalting [(desalting column bottom amount (part)/ desalting column charged amount (part)· 100] is from 0.1 to 40 wt. % (or from 1 to 35 wt. %, from 2 to 30 wt. %, from 3 to 25 wt. %, from 5 to 20 wt. %, or from 7 to 15 wt. %).
- [16] The method for producing 1,3-butylene glycol according to any one of [1] to [15], wherein the high boiling point component removal column used in the removing a high boiling point component is a packed column (or perforated-plate column or a bubble column), and a reboiler employed is a natural downward flow thin-film evaporator or a forced-stirring thin-film evaporator.
- [17] The method for producing 1,3-butylene glycol according to [16], wherein a theoretical number of plates of the high boiling point component removal column is from 1 to 100 plates (or from 2 to 90 plates, from 3 to 80 plates, from 4 to 70 plates, from 5 to 60 plates, from 8 to 50 plates, from 10 to 40 plates, or from 15 to 30 plates).
- [18] The method for producing 1,3-butylene glycol according to any one of or [17], wherein a feed position of the charged liquid is from 10 to 90% (or from 20 to 80%, from 30 to 70%, or from 40 to 60%) of a height of the column downward from the top of the high boiling point component removal column.
- [19] The method for producing 1,3-butylene glycol according to any one of to [18], wherein, in the distillation in the high boiling point component removal column, a pressure (absolute pressure) at the top of the column is from 0.01 to 50 kPa (or from 0.1 to 30 kPa, or from 0.3 to 20 kPa, or from 0.5 to 10 kPa).
- [20] The method for producing 1,3-butylene glycol according to any one of the items to [19], wherein at least a portion of the bottom from the high boiling point component removal column is recycled to a step prior to the removing a high boiling 15 point component.
- [21] The method for producing 1,3-butylene glycol according to any one of [16] to [20], wherein the reflux ratio of the high boiling point component removal column is 0.015 or greater (or 0.02 or greater, 0.03 or greater, 0.05 or greater, 0.07 or greater, 0.1 or greater, 0.2 or greater, 0.3 or greater, 0.4 or greater, 0.5 or greater, 0.6 or greater, 0.7 or greater, 0.8 or greater, 0.9 or greater, 1 or greater, 2 or greater, 3 or greater, 4 or greater, 5 or greater, 6 or greater, 7 or greater, 8 or greater, 9 or greater, 10 or greater, 15 or greater, 20 or greater, or 30 or greater).
- [22] The method for producing 1,3-butylene glycol according to [21], wherein an upper limit of the reflux ratio is 100 (or 50).
- [23] The method for producing 1,3-butylene glycol according to any one of [1] to [22], further including alkaline treatment for treating a process stream including 1,3-butylene glycol with a base.
- [24] The method for producing 1,3-butylene glycol according to [23], wherein the base is added in an amount of from 0.05 to 10 wt. % (or from 0.1 to 1.0 wt. %) relative to a crude 1,3-butylene glycol stream subjected to the alkaline treatment.
- [25] The method for producing 1,3-butylene glycol according to or [24], wherein the base added in the alkaline treatment is an alkali metal compound.
- [26] The method for producing 1,3-butylene glycol according to [25], wherein the alkali metal compound is sodium hydroxide (or potassium hydroxide, sodium (bi) carbonate, or potassium (bi) carbonate).
- [27] The method for producing 1,3-butylene glycol according to any one of [23] to [26], wherein a reaction temperature of the alkaline treatment is from 90 to 140° C. (or from 110 to 130° C.), and a reaction residence time is from 5 to 120 minutes (or from 10 to 30 minutes).
- [28] The method for producing 1,3-butylene glycol according to any one of to [27], wherein evaporation is performed in an evaporator used in the alkaline treatment under a reduced pressure at the top of the column of 20 kPa or less (absolute pressure) (or from 0.5 to 10 kPa (absolute pressure)) at from 90 to 120° C.
- [29] The method for producing 1,3-butylene glycol according to any one of [1] to [28], wherein the product column used in the product distillation is a packed column (or perforated-plate column or a bubble column), and a reboiler employed is a natural downward flow thin-film evaporator or a forced-stirring thin-film evaporator.

[30] The method for producing 1,3-butylene glycol according to [29], wherein a theoretical number of plates of the product column is from 1 to 100 plates (or from 2 to 90 plates, from 3 to 80 plates, from 4 to 70 plates, from 5 to 60 plates, from 8 to 50 plates, from 10 to 40 plates, or from 15 to 30 plates).

[31] The method for producing 1,3-butylene glycol according to or [30], wherein a feed position of the charged liquid in the product column is from 10 to 90% (or from 20 to 80%, from 30 to 70%, from 40 to 60%) of a height of the column downward from the top of the column, and a pressure (absolute pressure) at the top of the column is from 20 kPa or less (or from 0.1 to 10 kPa, from 0.3 to 8 kPa, or from 0.5 to 5 kPa).

[32] The method for producing 1,3-butylene glycol according to any one of to [31], wherein the reflux ratio in the product column is 0.2 or greater (or 0.3 or greater, 0.4 or greater, 0.5 or greater, 1 or greater, 2 or greater, 3 or greater, 4 or greater, 5 or greater, 6 or greater, 7 or greater, 8 or greater, 9 or greater, 10 or greater, 20 or greater, 50 or greater, 400 or greater, or 500 or greater).

[33] The method for producing 1,3-butylene glycol according to any one of to [32], wherein a concentration of 1,3-butylene glycol in the charged liquid into the product column is 90% or greater (or 91% or greater, 92% or greater, 93% or greater, 94% or greater, 95% or greater, 96% or greater, 97% or greater, 98% or greater, or 99% or greater).

[34] The method for producing 1,3-butylene glycol according to any one of to [33], wherein a content of water in the charged liquid into the product column is, for example, 3 wt. % or less, (2.8 wt. % or less, 2.6 wt. % or less, 2.4 wt. % or less, 2.2 wt. % or less, 2 wt. % or less, 1.8 wt. % or less, 1.6 wt. % or less, 1.4 wt. % or less, 1.4 wt. % or less, 1.2 wt. % or less, 1 wt. % or less, 0.95 wt. % or less, 0.9 wt. % or less, 0.8 wt. % or less, 0.7 wt. % or less, 0.6 wt. % or less, 0.5 wt. % or less, 0.4 wt. % or less, 0.3 wt. % or less, 0.2 wt. % or less, or 0.1 wt. % or less).

[35] The method for producing 1,3-butylene glycol according to any one of to [34], wherein a content of the low boiling point component other than water in the charged liquid into the product column is 1.8% or less (or 1.6% or less, 1.4% or less, 1.2% or less, 1.1% or less, 1% or less, 0.9% or less, 0.8% or less, 0.7% or less, 0.6% or less, 0.5% or less, or 0.4%).

[36] The method for producing 1,3-butylene glycol according to any one of to [35], wherein a distillation ratio in the product column is less than 30 wt. % (or less than 29 wt. %, less than 28 wt. %, less than 27 wt. %, less than 26 wt. %, less than 25 wt. %, less than 24 wt. %, less than 23 wt. %, less than 22 wt. %, less than 21 wt. %, or less than 20 wt. %, 19 wt. % or less, 18 wt. % or less, 17 wt. % or less, 16 wt. % or less or 15 wt. % or less, 12 wt. % or less, 10 wt. % or less, 8 wt. % or less, 5 wt. % or less, 3 wt. % or less, 2 wt. % or less, 1 wt. % or less, 0.8 wt. % or less, 0.6 wt. % or less, or 0.4 wt. % or less).

[37] The method for producing 1,3-butylene glycol according to any one of to [36], wherein at least a portion of a distillate from the product column is recycled to the dehydration, dealcoholization, low boiling point component removal prior to the performing product distillation, or a step prior to the steps.

[38] The method for producing 1,3-butylene glycol according to [37], wherein a recycled amount of the distillate from the product column recycled to the step prior to the performing product distillation is less than 30 wt. % with respect to a charged amount into the product column, in a range of not greater than a distilled amount in the product column.

[39] The method for producing 1,3-butylene glycol according to [37] or [38], wherein the recycled amount of the distillate from the product column recycled to the step prior to the performing product distillation is 0.01 wt. % or greater (or 0.05 wt. % or greater, 0.1 wt. % or greater, 0.5 wt. % or greater, 1 wt. % or greater, 1.5 wt. % or greater, 2 wt. % or greater, 3 wt. % or greater, 4 wt. % or greater 5 wt. % or greater, 7 wt. % or greater, 10 wt. % or greater, or 20 wt. % or greater) with respect to the charged amount into the product column, in the range of not greater than the distilled amount in the product column.

[40] A 1,3-butylene glycol product, having an initial boiling point of higher than 203° C. (or 204° C. or higher, 05° C. or higher, 206° C. or higher, 207° C., or 208° C. or higher) and a water content of less than 0.4 wt. % (or 0.3 wt. % or less, 0.2 wt. % or less, 0.1 wt. % or less, 0.07 wt. % or less, 0.05 wt. % or less, 0.03 wt. % or less, 0.02 wt. % or less, 0.01 wt. % or less, or 0.005 wt. % or less).

[41] The 1,3-butylene glycol product according to [40], having, in a gas chromatographic analysis performed under conditions set forth below:

an area ratio of a 1,3-butylene glycol peak of greater than 98.5% (or 98.6% or greater, 98.7% or greater, 98.8% or greater, 98.9% or greater, 99% or greater, 99.1% or greater, 99.2% or greater, 99.3%, 99.4% or greater, 99.5% or greater, 99.6% or greater, 99.7% or greater, or 99.8% or greater) and a total area ratio of peaks shorter in retention time than the 1,3-butylene glycol peak of less than 0.3% (or 0.25% or less, 0.23% or less, 0.2% or less, 0.17% or less, 0.15% or less, 0.12% or less, 0.1% or less, 0.07% or less, 0.04% or less, 0.03% or less, 0.02% or less, 0.01% or less, 0.007% or less, 0.005% or less, or 0.002% or less), the conditions for the gas chromatographic analysis are as follows:

Analytical Column: a column with dimethylpolysiloxane as a stationary phase, having a length of 30 m, an inner diameter of 0.25 mm, and a film thickness of 1.0 μm Heating conditions: heating from 80° C. to 120° C. at 5° C./min, then heating again to 160° C. at 2° C./min and maintaining for 2 minutes, and further heating to 230° C. at 10° C./min and maintaining at 230° C. for 18 minutes Sample Introduction Temperature: 250° C.

Carrier Gas: helium

Column Gas Flow Rate: 1 mL/min

Detector and Detection Temperature: a flame ionization detector (FID), 280° C.

[42] A moisturizer containing the 1,3-butylene glycol product described in any one of or

[43] The moisturizer according to [42], wherein a content of the 1,3-butylene glycol product is 10 wt. % or greater (or 30 wt. % or greater, 50 wt. % or greater, 80 wt. % or greater, 90 wt. % or greater, or 100 wt. %).

[44] A cosmetic product containing the moisturizer described in or [43].

[45] The cosmetic product according to [44], wherein a blending amount of the 1,3-butylene glycol product is from 0.01 to 40 wt. % (or from 0.1 to 30 wt. %, from 0.2 to 20 wt. %, from 0.5 to 15 wt. %, or from 1 to 10 wt. %).

INDUSTRIAL APPLICABILITY

With the 1,3-butylene glycol product according to the present disclosure, high-purity 1,3-butylene glycol having a very low content of the low boiling point component and a high initial boiling point, with a high recovery ratio can be produced. This 1,3-butylene glycol product has excellent moisturizing performance and can be used as a raw material for a moisturizer and a cosmetic product that can retain high quality for a long period of time.

REFERENCE SIGNS LIST

A: Dehydration column
B: Desalting column
C: Distillation column for removing high boiling point substance (high boiling point component removal column)
D: Alkaline reactor
E: Dealkalization column
F: Product distillation column (product column)
A-1, B-1, C-1, E-1, F-1: Condenser A-2, C-2, F-2: Reboiler
X-1: Crude 1,3-butylene glycol
X-2: Water (discharged water)
X-3: A salt, a high boiling point substance, and a portion of 1,3-butylene glycol
X-4: A high boiling point substance and a portion of 1,3-butylene glycol
X-5: Sodium hydroxide, a high boiling point substance, and a portion of 1,3-butylene glycol
X-6: A low boiling point substance and a portion of 1,3-butylene glycol
Y: 1,3-butylene glycol product

The invention claimed is:

1. A method for producing 1,3-butylene glycol to yield purified 1,3-butylene glycol from a reaction crude liquid comprising 1,3-butylene glycol, the method comprising:
performing dehydration including removing water by distillation;
removing a high boiling point component including removing a high boiling point component by distillation; and
performing product distillation to yield purified 1,3-butylene glycol,
wherein, in a product column for use in the performing product distillation, a charged liquid including 1,3-butylene glycol is distilled off under a condition that a reflux ratio is 0.4 or greater, a liquid in which a low boiling point component is concentrated is distilled off from above a charging plate, and 1,3-butylene glycol is extracted from below the charging plate,
wherein a distillation ratio in the product column is set to be less than 25 wt. %, and
wherein the reaction crude liquid comprising 1,3-butylene glycol is produced by hydrogenation of acetaldols as a raw material for hydrogenation, the raw material containing water, and a water content in the raw material for hydrogenation is 2 wt. % or greater.

2. The method for producing 1,3-butylene glycol according to claim 1, further comprising performing alkaline treatment including treating a process stream including 1,3-butylene glycol with a base.

3. The method for producing 1,3-butylene glycol according to claim 1, further comprising performing desalting including removing a salt in the process stream including 1,3-butylene glycol.

4. The method for producing 1,3-butylene glycol according to claim 1, further comprising performing dealcoholization including removing a low boiling point component including an alcohol, the low boiling point component being present in the process stream including 1,3-butylene glycol.

5. The method for producing 1,3-butylene glycol according to claim 1, wherein a concentration of 1,3-butylene glycol in the charged liquid into the product column is 90% or greater.

6. The method for producing 1,3-butylene glycol according to claim 1, wherein the water content in the charged liquid into the product column is 3 wt. % or less.

7. The method for producing 1,3-butylene glycol according to claim 1, wherein a content of the low boiling point component other than water in the charged liquid into the product column is 1.8% or less.

8. The method for producing 1,3-butylene glycol according to to claim 1, wherein a theoretical number of plates in the product column is from 1 to 100 plates.

9. The method for producing 1,3-butylene glycol according to claim 1, wherein at least a portion of a distillate from the product column is recycled to the dehydration, dealcoholization, low boiling point component removal prior to the performing product distillation, or a step prior to the steps.

10. The method for producing 1,3-butylene glycol according to claim 9, wherein a recycled amount of the distillate from the product column recycled to the step prior to performing the product distillation is less than 30 wt. % with respect to a charged amount into the product column, in a range of not greater than a distilled amount in the product column.

11. The method for producing 1,3-butylene glycol according to claim 9, wherein the recycled amount of the distillate from the product column recycled to the step prior to the performing product distillation is 0.01 wt. % or greater with respect to the charged amount into the product column, in the range of not greater than the distilled amount in the product column.

* * * * *